United States Patent [19]

Matsumura et al.

[11] Patent Number: 4,647,516
[45] Date of Patent: Mar. 3, 1987

[54] INTERNAL REFORMING TYPE FUEL CELL

[75] Inventors: Mitsuie Matsumura; Tatsunori Okada; Yoshihide Gonjo, all of Amagasaki, Japan

[73] Assignee: Mitsubishi Denki Kabushiki Kaisha, Tokyo, Japan

[21] Appl. No.: 830,983

[22] Filed: Feb. 19, 1986

[30] Foreign Application Priority Data

Feb. 20, 1985 [JP] Japan .................................. 60-30607

[51] Int. Cl.⁴ ............................................. H01M 8/06
[52] U.S. Cl. ........................................ 429/19; 429/16; 429/17
[58] Field of Search .................. 429/16, 17, 19, 34, 429/13

[56]   References Cited
U.S. PATENT DOCUMENTS

| 3,488,226 | 1/1970 | Baker et al. | 429/16 |
| 3,615,839 | 10/1971 | Thompson et al. | 429/16 |
| 4,046,956 | 9/1977 | Fancilullo | 429/20 |
| 4,098,960 | 7/1978 | Gagnon | 429/25 |
| 4,182,795 | 1/1980 | Baker et al. | 429/13 |
| 4,192,906 | 3/1980 | Maru | 429/13 |
| 4,202,933 | 5/1980 | Reiser | 429/13 |
| 4,310,604 | 1/1982 | Marchetti | 429/17 |

Primary Examiner—Anthony Skapars
Attorney, Agent, or Firm—Leydig, Voit & Mayer

[57]   ABSTRACT

An internal reforming type fuel cell comprising, as reforming regions packed with a reforming catalyst, a first reforming region which is thermally held in contact with a unit fuel cell and which does not adjoin a fuel gas side electrode and a second reforming region which adjoins the fuel gas side electrode. Part of a fuel gas externally supplied is reformed in the first reforming region, whereupon the partly reformed fuel gas is supplied into the second reforming region.

4 Claims, 3 Drawing Figures

INTERNAL REFORMING TYPE FUEL CELL

BACKGROUND OF THE INVENTION

This invention relates to an internal reforming type fuel cell. More particularly, it relates to an internal reforming type fuel cell which is supplied with a fuel gas reformed by a catalyst and an oxidizing gas, to cause electrochemical reactions.

FIG. 1 shows an internal-reforming molten-carbonate type fuel cell (hereinbelow, simply termed 'fuel cell') in a prior art. In the figure, numeral 1 designates an electrolyte matrix, numeral 2 a fuel gas side electrode, and numeral 3 an oxidizing gas side electrode. Numeral 4 indicates a fuel gas side perforated plate which supports the fuel gas side electrode 2 and which separates a reforming catalyst to be described later, from the fuel gas side electrode 2. Numeral 5 indicates an oxidizing gas side perforated plate which supports the oxidizing gas side electrode 3. Shown at numeral 6 is a separator plate, which separates and defines a fuel gas side gas passage and an oxidizing gas side gas passage. Further, in stacking a plurality of unit fuel cells 7 each of which is constructed of the electrolyte matrix 1, the fuel gas side electrode 2, the oxidizing gas side electrode 3, the fuel gas side perforated plate 4 and the oxidizing gas side perforated plate 5, and the separated plates 6 function to connect the unit fuel cells 7 in electrical series. The fuel gas side gas passage 8 and the oxidizing gas side gas passage 9 are defined by the separator plates 6. The reforming catalyst is shown at numeral 10, and it promotes the reaction of decomposing hydrocarbon or alcohols to produce hydrogen.

With the above construction, a fuel gas whose principal ingredients are hydrocarbon or alcohols and steam and also an oxidizing gas whose principal ingredients are oxygen and carbon dioxide are supplied to the fuel cell in cruciform flow fashion, and they are respectively introduced into the fuel gas side gas passage 8 and the oxidizing gas side gas passage 9. The hydrocarbon or alcohols in the fuel gas fed into the fuel gas side gas passage 8 is/are modified into a fuel gas whose principal ingredients are hydrogen and carbon monoxide, by the action of the reforming catalyst 10 contained in the fuel gas side gas passage 8 and owing to chemical reactions as indicated by the following formulas. The reactions form an endothermic reaction as a whole, and thermal energy accessorily produced by the fuel cell is directly utilized.

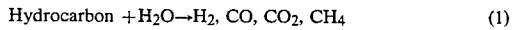  (1)

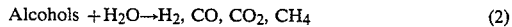  (2)

  (3)

  (4)

Hydrogen produced within the fuel gas side gas passage 8, and oxygen and carbon dioxide in the oxidizing gas diffuse through the pores of the fuel gas side perforated plate 4 and the oxidizing gas side perforated plate 5 respectively. They cause electrochemical reactions as indicated by the following formulas in the fuel gas side electrode 2 and the oxidizing gas side electrode 3 respectively:

(fuel gas side electrode)

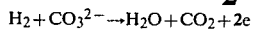  (5)

(Oxidizing gas side electrode)

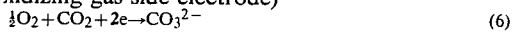  (6)

Through these series of chemical and electrochemical reactions, chemical energy possessed by the fuel gas is converted into electric energy and the thermal energy is produced accessorily.

In this manner, in the internal reforming type fuel cell, waste heat accessorily produced by the electrochemical reactions based on the formulas (5) and (6) is directly utilized as reaction heat necessary for the reforming reactions, and the cooling of the fuel cell is conjointly performed, thereby to bring forth the merit that the efficient utilization of the waste heat is made possible as a system. Besides, a heat exchanger may be small in size owing to the mitigation of the cooling load of the fuel cell, and a fuel processor for decomposing hydrocarbon or alcohols need not be disposed outside, so that the miniaturization of the system becomes possible advantageously.

Further, the reforming reactions of Formulas (1)–(4) and the electrochemical reaction of Formula (5) are carried out in parallel in the same space, whereby hydrogen produced by the reforming reactions (1)–(4) is continuously consumed by the electrochemcial reaction of Formula (5), and steam required for causing the reforming reactions of Formulas (1)–(4) to proceed is continuously supplied from the electrochemical reaction of Formula (5). By carrying out both the reactions in parallel in this manner, there are attained the merits that the proceeding of the reforming reactions of Formulas (1)–(4) is promoted more than in a case of performing them alone, and that the quantity of undecomposed hydrocarbon or alcohols at the outlet of a reforming region can be reduced.

Here, the reforming catalyst 10 is, for example, an active material such as nickel supported on a carrier whose principal ingredient is alumina, magnesia or the like. In order to maintain the activity of the reforming catalyst 10, the fuel cell needs to be operated while the oxidation of the active material such as nickel as indicated by the following formula is prevented:

  (7)

The decomposition of hydrocarbon or alcohols and the production of hydrogen, which employ a conventional reforming catalyst, are carried out by adding steam as indicated by Formulas (1)–(4). Since, in this case, the oxidation of the active material such as nickel is prevented by the produced hydrogen, an operation stable for a long term is possible.

In the internal-reforming molten-carbonate type fuel cell, however, hydrogen produced by Formulas (1)–(4) is consumed in parallel with the production, to produce steam as indicated by Formula (5). Accordingly, the concentration of hydrogen lowers, and the oxidation of the active material of the reforming catalyst 10, e.g., nickel takes place, so that the activity of the reforming catalyst 10 is prone to lower.

The conditions of such oxidation of the active material differ depending upon the kind of the active material, the kind of the carrier, temperature, etc. Regarding the catalyst which employs nickel as the active material, it is known as one criterion that when the ratio of the concentration of water vapor to the concentration of hydrogen exceeds 10–20, the oxidation of the nickel takes place to lower the activity of the catalyst.

The ratio of the water vapor concentration to the hydrogen concentration has a distribution in the flowing direction of the fuel gas. Usually, the ratio of the water vapor concentration to the hydrogen concentration becomes the greatest in the inlet portion of the fuel gas, and the ratio in that portion is the most relevant to the stability of the reforming catalyst 10. There are two methods for holding this ratio small. One of them is to make active the reactions of decomposing hydrocarbon and producing hydrogen in Formulas (1)–(4), that is, to raise the activity of the reforming catalyst 10 and to increase the packing quantity thereof. The other is to suppress the electrochemical reaction of consuming hydrogen in Formula (5), that is, to output only a small current.

In the prior-art fuel cell of the internal-reforming molten-carbonate type, the above requirement has been met in such a way that the packing quantity of the reforming catalyst 10 is made several times larger than in an ordinary reforming reactor.

WIth the prior-art internal reforming type fuel cell thus far described, packing a large quantity of reforming catalyst therein has been necessary for providing a high output stably over a long term. As a result, the dimensions of the fuel gas side gas passage have been enlarged, presenting the problem that the internal reforming type fuel cell becomes large in size as a whole.

Summary of the Invention

This invention has been made in order to solve the problems as described above, and has for its object to provide an internal reforming type fuel cell which can reduce the packing quantity of a reforming catalyst and can be generally reduced in size while keeping the merits of the fuel cell of this type.

An internal reforming type fuel cell according to this invention comprises, as reforming regions packed with a reforming catalyst, a first reforming region which lies in thermal contact with a unit fuel cell and which does not adjoin a fuel gas side electrode and a second reforming region which adjoins the fuel gas side electrode. Part of a fuel gas externally supplied is reformed in the first reforming region, whereupon the partly reformed fuel gas is supplied into the second reforming region.

BRIEF DESCRIPTION OF THE DRAWINGS

In the drawings, the same symbols indicate identical or corresponding portions.

DESCRIPTION OF THE PREFERRED EMBODIMENTS

Figure 1:
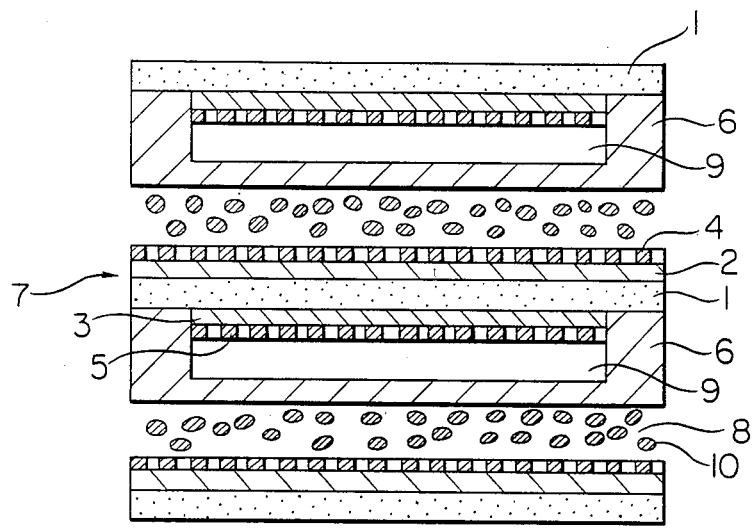
FIG. 1 is a partial sectional view of an internal reforming type fuel cell in a prior art.
Figure 2:
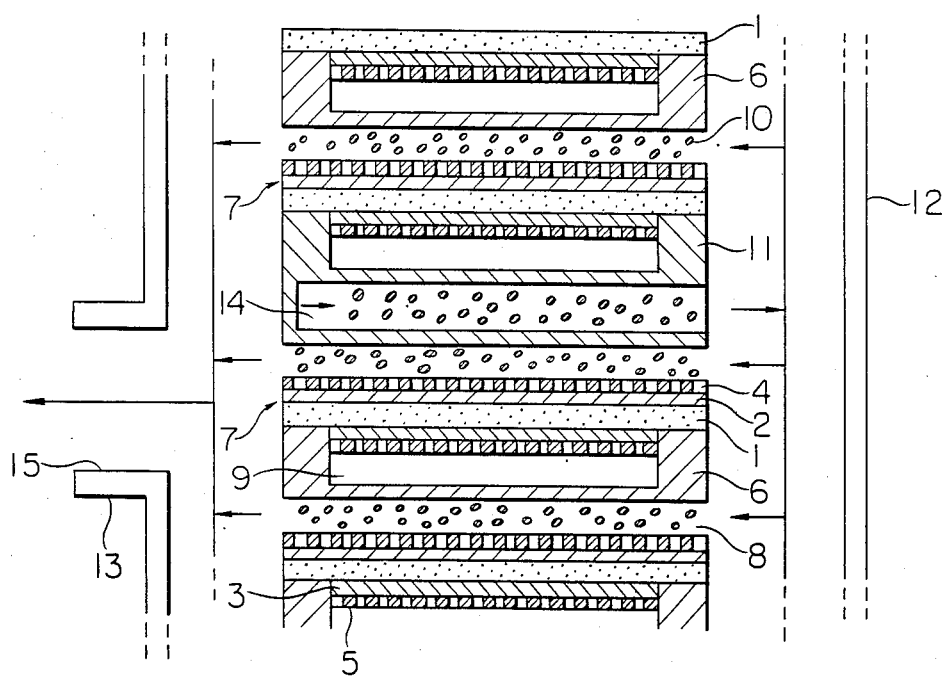
FIG. 2 is a partial sectional view showing an embodiment of this invention.
Figure 3:
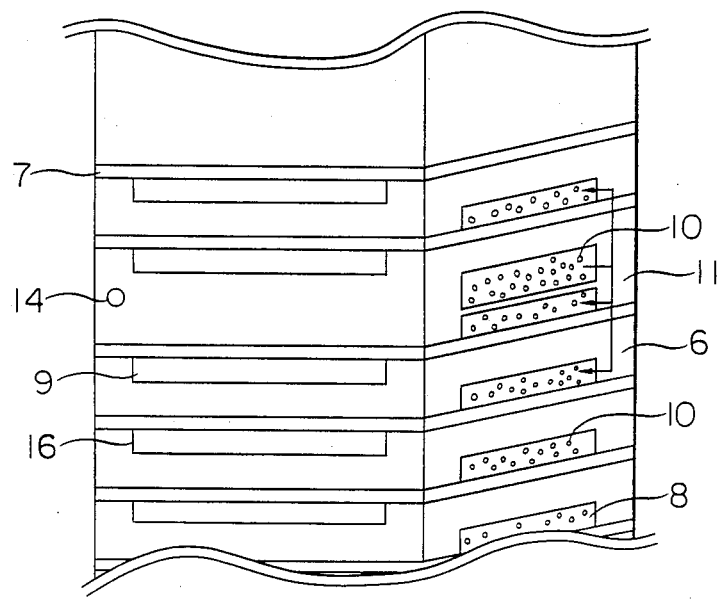
FIG. 3 is a partial perspective view showing the embodiment of this invention.

FIGS. 2 and 3 show embodiments of this invention, in which the same symbols as in FIG. 1 indicate identical or corresponding portions. Numeral 11 designates a cooling plate which functions to hold the reforming catalyst 10 therein and also to define reaction gas passages with the upper and lower surfaces thereof likewise to the separator plate 6.

In FIG. 2, gas manifolds which function to supply and exhaust the fuel gas to and from the stacked structure of the unit fuel cells 7 are also shown in order to elucidate the flow of the fuel gas. The inverting gas manifold 12 inverts the flow of the fuel gas egressing from the cooling plates 11 so as to supply the fuel gas into the fuel gas side gas passage 8. The fuel gas outlet manifold 13 exhausts out the reacted fuel gas egressing from the fuel gas side gas passage 8. Numeral 14 indicates a supply port for the fuel gas, numeral 15 a fuel gas outlet, and numeral 16 an oxidizing gas inlet. Arrows indicate the streams of the fuel gas.

With the above construction, the fuel gas whose principal ingredients are hydrocarbon or alcohols and steam externally supplied into the first reforming regions defined by the cooling plates 11, through the sideward supply port 14 as shown in FIG. 2. Here, the first reforming region is a region which receives the reforming catalyst 10 therein and which is thermally held in contact with the unit fuel cells 7. In addition, it is so arranged that the fuel gas flowing therein does not touch the fuel gas side electrode 2, and it has the function of reforming the fuel gas therein. Concretely, the first reforming region decomposes hydrocarbon or alcohols contained in the fuel gas and reforms the fuel gas into hydrogen rich fuel gas in accordance with Formulas (1)–(4) by utilizing heat accessorily produced in the unit fuel cells 7 and with the aid of the reforming catalyst 10. As shown in FIG. 2, the hydrogen rich fuel gas has the flowing direction thereof inverted by the inverting gas manifold 12 and is supplied into the fuel gas side gas passage 8. The fuel gas side gas passage 8 holds the reforming catalyst 10 therein and lies in contact with the fuel gas side electrodes 2, and it corresponds to the second reforming region. Here, the second reforming region receives the reforming catalyst 10 therein and is thermally held in contact with the unit fuel cells 7. In addition, it is so arranged that the fuel gas flowing therein touches the fuel gas side electrodes 2 therein, and the reforming reactions of Formulas (1)–(4) and the electrochemical reaction of Formula (5) are carried out in parallel therein. By performing the reforming reactions in parallel with the electrochemical reaction within the fuel gas side gas passage 8 in this manner, the proceeding of the reforming reactions is promoted, and the quantity of undecomposed hydrocarbon or alsochols can be reduced. The fuel gas after the reactions is exhausted out of the system through the fuel gas outlet manifold 13.

As thus far described, in this invention, the reforming reactions of the fuel gas are dividely performed in the two places; the first reforming region where only the reforming reactions are carried out and the second reforming region where the reforming reactions and the electrochemical reaction are carried out in parallel. Since the first reforming region is used for performing only the reforming reactions, it is essentially the same as the conventional reforming reactor. In the first reforming region, accordingly, the handling of the reforming catalyst may be the same as in the prior art reforming reactor, and the packed quantity of the reforming catalyst may be the same as in the prior art. In the second reforming region where the reforming reactions and the electrochemical reaction are performed in parallel, the fuel gas already contains hydrogen produced in the first reforming region, enough to prevent the oxidation of the active material of the reforming catalyst 10. Unlike the prior art, therefore, the lowering of the activity of the catalyst attributed to the oxidation of the active material does not become a problem. Even in the second reforming region, accordingly, the packed quantity of the reforming catalyst 10 may be equal to that in the conventional reforming reactor. In this way, while heat accessorily produced in the unit fuel cell 7 is utilized as in the prior-art internal reforming type fuel cell, the reforming reactions are partially performed in parallel with the electrochemical reaction, whereby the merits of the prior-art internal reforming type fuel cell, such as the promotion of the reforming reactions of Formulas (1)–(4), are kept and yet the packed quantity of the reforming catalyst 10 can be reduced.

The above embodiment is so constructed that the whole amount of the fuel gas externally supplied is fed into the first reforming region, namely, the cooling plates 11 and that the fuel gas reformed in the first reforming region is fed into the second reforming region, namely, the fuel gas side gas passage 8. It is also allowed, however, to build a structure wherein the fuel gas externally supplied is divided into two parts, one of which is fed into the first reforming region and is reformed, and the remainder of the fuel gas externally supplied and the part of the fuel gas reformed in the first reforming region are joined and then fed into the second reforming region. Concretely, in the arrangement of FIG. 2, part of the fuel gas may be fed into the cooling plates 11, and the remainder may be fed from the inverting gas manifold 12. Although such a structure involves somewhat complicated piping, it is desirable for controlling the amount of decomposition of hydrocarbon or alcohols in the first reforming region. Especially in a case where the proportion of hydrocarbon or alcohols to be reformed in the first reforming region is small relative to hydrocarbon or alcohols supplied, such a structure is more desirable from the aspect of the stability of the reforming catalyst in the first reforming region.

As apparent from the foregoing, this invention consists in that an internal reforming type fuel cell is furnished therein with a first reforming region for performing only reforming reactions and a second reforming region for performing the reforming reactions and an electrochemical reaction in parallel, and that a fuel gas externally supplied is reformed in the first reforming region and then fed into the second reforming region. Thus, while the merits of the fuel cell of the specified type are kept, there are brought forth the effects that the quantity of packing of a reforming catalyst can be reduced and that the miniaturization of the internal reforming type fuel cell can be achieved.

What is claimed is:

1. An internal reforming type fuel cell comprising:
a first reforming region which receives a reforming catalyst therein, which is thermally held in contact with unit fuel cells, which is isolated from fuel gas side electrodes and in which only reformation of a fuel gas is carried out, and
a second reforming region which receives the reforming catalyst therein, which adjoins the fuel gas side electrodes and in which an electrochemical reaction is carried out in the fuel gas side electrodes while the partly reformed fuel gas fed from said first reforming region is being reformed.

2. An internal reforming type fuel cell according to claim 1, wherein said first reforming region is fed with part of the fuel gas supplied externally and reforms it into the fuel gas containing hydrogen as its principal ingredient, and said second reforming region is fed with both the remainder of the fuel gas supplied and the fuel gas reformed in said first reforming region.

3. An internal reforming type fuel cell according to claim 1, wherein said first reforming region is defined by cooling plates coupled to the unit fuel cells, and said second reforming region is defined by a fuel gas side gas passage.

4. An internal reforming type fuel cell according to claim 1, wherein said internal reforming type fuel cell is an internal-reforming molten-carbonate type fuel cell.

* * * * *